United States Patent [19]

Schoeff

[11] 3,868,517

[45] Feb. 25, 1975

[54] LOW HYSTERESIS THRESHOLD DETECTOR HAVING CONTROLLED OUTPUT SLEW RATE

[75] Inventor: John A. Schoeff, Mesa, Ariz.

[73] Assignee: Motorola, Inc., Chicago, Ill.

[22] Filed: June 15, 1973

[21] Appl. No.: 370,517

[52] U.S. Cl. ............ 307/235 R, 307/218, 307/237, 307/263, 307/270, 307/280, 307/319

[51] Int. Cl. ... H03k 5/153, H03k 5/08, H03k 3/295

[58] Field of Search ........ 307/235 R, 213, 214, 215, 307/218, 270, 263, 255, 297, 313, 237, 280, 300, 319

[56] References Cited

UNITED STATES PATENTS

| | | | |
|---|---|---|---|
| 3,217,181 | 11/1965 | Zuk | 307/215 |
| 3,358,154 | 12/1967 | Hung | 307/215 |
| 3,394,268 | 7/1968 | Murphy | 307/214 X |
| 3,436,738 | 4/1969 | Martin | 307/238 X |
| 3,515,899 | 6/1970 | May | 307/214 X |
| 3,619,659 | 11/1971 | Meyer | 307/263 |
| 3,735,151 | 5/1973 | Frederiksen et al. | 307/235 R |

OTHER PUBLICATIONS

Simpson, "Threshold Detector," IBM Tech. Discl. Bull.; Vol. 9, No. 12, pp. 1812–1813; 5/1967.

*Primary Examiner*—Stanley D. Miller, Jr.
*Assistant Examiner*—L. N. Anagnos
*Attorney, Agent, or Firm*—Vincent J. Rauner; Maurice J. Jones, Jr.

[57] ABSTRACT

The disclosed threshold detector is includable in a monolithic chip portion and draws a constant current to maintain the chip portion at an even temperature to facilitate virtual elimination of input hysteresis and to simplify power supply design. The outputs of current sources included on the chip are switched between alternate current sinking paths in response to the magnitude of the input voltage crossing the threshold. Diodes keep selected current sinking transistors from saturating to maintain the speed of operation. The magnitude of the source currents and the values of the diode and output capacitances control the rise and fall times of the output voltage. A clamp circuit is connected to the output terminal to clamp the output voltage at a predetermined level.

21 Claims, 3 Drawing Figures

LOW HYSTERESIS THRESHOLD DETECTOR HAVING CONTROLLED OUTPUT SLEW RATE

CROSS REFERENCE TO RELATED APPLICATIONS

The subject matter of the present application is related to the subject matter of the patent application entitled "Dual Ramp Analog-to-Digital Converter Having a Monolithic Analog Subsystem," Ser. No. 370,519 and of the patent application entitled "Balanced Double-to-Single Ended Converter Stage For Use With A Differential Amplifier," Ser. No. 370,518, which were filed on even date herewith by the present inventor and assigned to the same assignee.

BACKGROUND OF THE INVENTION

Many applications exist for a threshold detector circuit which has substantially equal threshold levels for causing its output to change from a low-to-high level and from a high-to-low level in response to the magnitude of an input signal crossing the threshold level. Schmitt trigger circuits and other threshold detector circuits are known for providing output signals indicating that the magnitude of an input signal is either above or below a particular threshold level. Many such prior art circuits have hysteresis which is the quality of switching from a first state to a second state in response to the magnitude of the input signal crossing one threshold level and switching from the second state to the first state in response to the magnitude of the input signal crossing a different threshold level. In some applications, it is desirable to have virtually no hysteresis so that the threshold detector switches from the first state to the second state in response to the magnitude of the input signal crossing a threshold level in a first direction and switches from the second state to the first state in response to the magnitude of the input signal crossing virtually the same threshold level in a second direction. One application for a no-hysteresis, threshold detector is presented by a dual ramp, analog-to-digital converter which requires a threshold detector that provides a first output signal state in response to an input ramp signal magnitude rising away from a predetermined reference voltage through a predetermined threshold level and provides a second output signal state as the input ramp signal magnitude falls toward the reference voltage through the same threshold level.

In many applications the slew rate of the threshold detector, which is the rate the output signal magnitude changes between its two output signal states in response to the magnitude of the input signal crossing the threshold level, is an important parameter. For instance, in the dual ramp analog-to-digital converter the slew rate of the threshold detector must not be so fast that it creates unwanted high frequency signal components which falsely trigger the converter circuit. Moreover, in such applications it is important that the slew rate not be so slow as to detrimentally affect the performance of the analog-to-digital converter circuit. Hence, a threshold detector circuit is desirable which has a controlled output slew rate wherein the rise and fall times of its output signal are controlled to be within predetermined limits.

In the past, two logic inverters have been connected in series so that the first drives the second to form an inverting buffer amplifier which performs the function of a threshold detector. However, such circuits draw input currents of undesirably large magnitude because of their relatively low input impedance and have gains which are undesirably low for some applications. Moreover, such circuits have threshold hysteresis which varies as a function of temperature. Such hysteresis results partly from the die temperature changing as a function of the output signal state which causes the threshold level of the solid-state devices included therein to change. The low input impedance of some prior art threshold detectors tend to load the driving source to further contribute unwanted hysteresis. Moreover, such circuits do not provide controlled slew rate.

Other prior art threshold detector circuits require either gold doping for carrier lifetime attenuation or Schottky diodes, or both, to facilitate nonsaturating operation to have acceptable speed of operation. Such Schottky diodes and gold doping reduce the desirability of providing these prior art threshold detector in integrated circuit form because of increased processing complexity as compared to configurations which don't have such requirements. The increased processing complexity generally means increased cost and lower yield rates. Also, some prior art threshold detector circuits require feedback capacitors which have values that make them unsuitable for being conveniently manufactured by known integrated circuit processes suitable for mass production. Thus, such capacitors may have to be provided as external components.

SUMMARY OF THE INVENTION

Accordingly, it is an object of this invention to provide an improved threshold detector circuit.

Another object of this invention is to provide a threshold detector circuit having virtually no hysteresis of operation.

Still another object of this invention is to provide a threshold detector circuit configuration which is suitable for mass production fabrication in integrated circuit form by standard bipolar processes.

A further object of this invention is to provide a threshold detector circuit having controlled output slew rate.

A still further object of the invention is to provide a threshold detector having high input impedance and high gain.

An additional object of the invention is to provide a high speed threshold detector which requires neither Schottky diodes nor gold doping.

A still additional object of this invention is to provide a threshold detector circuit which draws constant current regardless of the output signal state thereof.

The subject threshold detector circuit responds to an input voltage magnitude below a threshold level to provide an output voltage of a first level and to an input voltage magnitude above substantially the same threshold level to provide an output voltage of a second level. The configuration and component values of the threshold detector are selected to facilitate fabrication in monolithic form. The threshold detector circuit is adapted to draw a constant current from a power supply to sustain the chip at an even temperature so that its on-to-off and off-to-on threshold levels are virtually equal to each other and to facilitate power supply design. A plurality of constant current supplies are included in the circuit each of which have alternate current sinking paths associated therewith through which its output current flows in response to whether the magnitude of the input voltage is above or below the threshold.

More particularly, if the magnitude of the input signal is below the predetermined threshold level, an input current sink conducts the current from a first current source and supplies a first control signal which renders an output current sink conductive so that it conducts the current from an output current source to keep it from charging an output capacitance. Hence, the output signal level remains at a low value. As the magnitude of the input signal rises above the threshold level, the input current sink is rendered nonconductive and applies a second control signal to the output current sink to render it nonconductive. As a result, the current from the output current source is applied to the output capacitance which charges to the second higher output level. The magnitude of the current supplied by the output current source and the value of the output capacitance determines the rate of rise of the output signal from the first level to the higher second level. A diode clamp is connected to the output terminal to keep the second level of the output signal from exceeding a predetermined magnitude. As the magnitude of the input signal falls below the threshold level, the first current sink is again rendered conductive and provides a third control signal which renders the output current sink conductive and allows the output capacitor to discharge. Clamping diodes are utilized at strategic points in the circuit to keep selected transistors from saturating to thereby provide increased speed of operation. The value of the capacitance inherent in some of these diodes and the magnitude of the current supplied through them controls the discharge rate of the output capacitance to control the rate of change of the magnitude of the output voltage from the high output level to the low output level.

DETAILED DESCRIPTION OF THE PREFERRED EMBODIMENT

Figure 1:
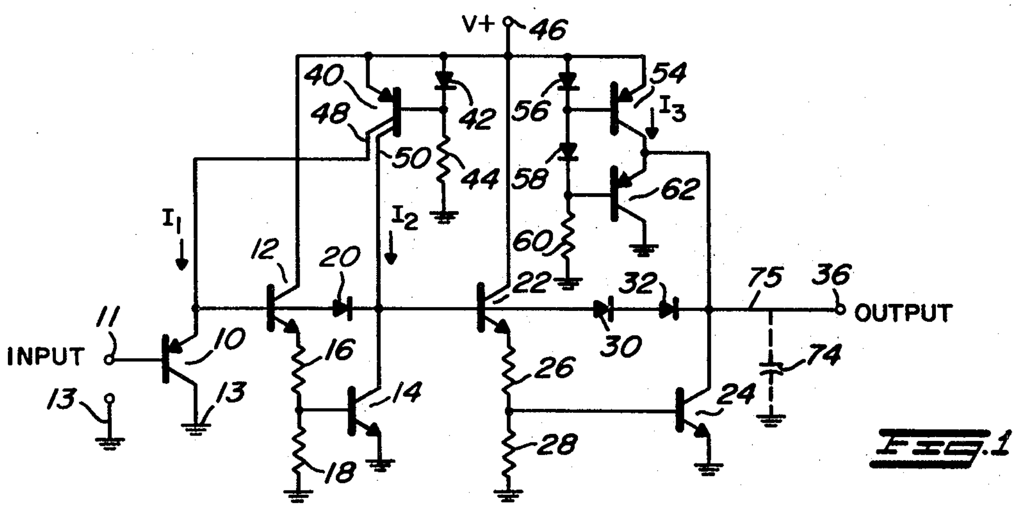
FIG. 1 is a schematic diagram of a preferred embodiment of the invention and illustrates the paths of current flow through the circuit when it is in a first of its two stable states.
Figure 2:
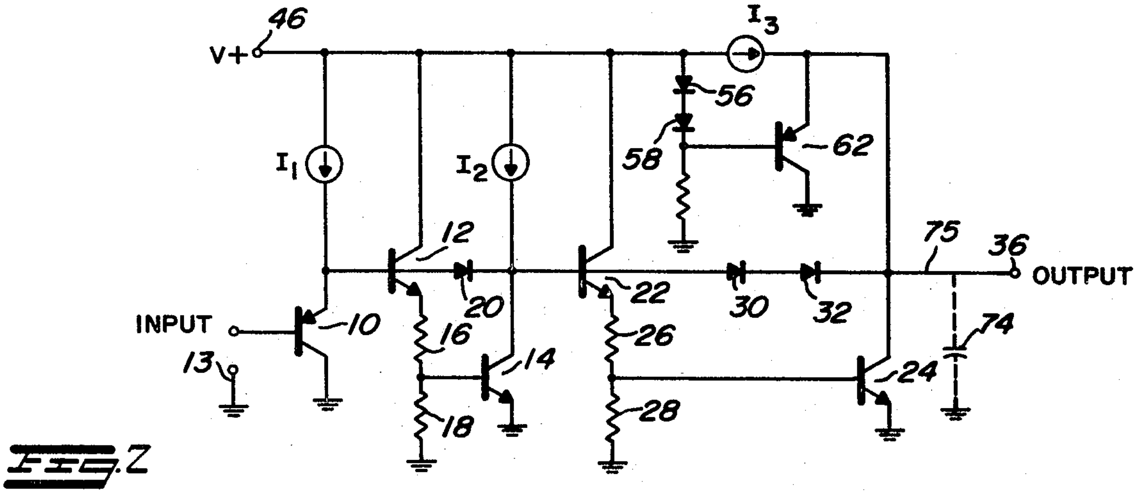
FIG. 2 shows a portion of the circuit of FIG. 1 and illustrates the paths of current through the circuit when it is in the second of its two stable states.

Referring now to the drawing, wherein the same reference numbers are used throughout FIGS. 1 and 2 to designate the same elements, there is shown in FIG. 1 a threshold detector circuit having virtually no hysteresis and controlled output slew rate in accordance with a preferred embodiment of the invention. The circuit shown in FIG. 1 is preferably fabricated as a monolithic integrated circuit, either as an independent threshold detector circuit or as part of a larger array including circuits performing other operations.

The output slew rate is the rate of rise and the rate of fall of the magnitude of the output voltage in response to the magnitude of the input voltage crossing a threshold level. The threshold detector circuit of FIG. 1 responds to an input signal having a magnitude changing away from a reference level and passing through the threshold of the circuit to provide an output signal of a first level. The threshold circuit also responds to the magnitude of the input signal changing toward the reference level and passing through the threshold to provide an output signal of a second level. Thus, the circuit of FIG. 1 changes an analog input signal into a binary output signal.

As shown in FIG. 1, the threshold circuit includes a PNP driving transistor 10 having its base connected to input terminal 11 and its collector connected to ground or reference terminal 13. The emitter of transistor 10 is connected to drive a first stage comprised of NPN transistors 12 and 14. A voltage divider formed by resistors 16 and 18 connects the emitter of transistor 12 to the base of transistor 14 and diode 20 connects the base of transistor 12 to the collector of transistor 14. A second stage, which has a configuration similar to the foregoing first stage, includes NPN transistors 22 and 24. Another voltage divider comprised of resistors 26 and 28 connects the emitter of transistor 22 to the base of transistor 24. Moreover, series connected diodes 30 and 32 connect the base of transistor 22 to the collector of output transistor 24. The cathode of diode 32 and the collector of transistor 24 are connected to output terminal 36.

Three constant current sources or supplies are provided for supplying the above described first and second stages. The first and second current sources are formed by double collector, PNP transistor 40, having diode 42 connected between its base and emitter electrodes and resistor 44 connected from its base electrode to the ground or reference terminal. The emitter of transistor 40 and the anode of diode 42 are connected to power supply terminal 46, to which a positive power supply voltage, V+ is applied. As is well known in the art, diode 42 responds to the current flowing through the series circuit comprised of diode 42 and resistor 44 to supply a substantially constant base-to-emitter voltage across the base and emitter electrodes of transistor 40. As a result, the currents flowing out of collector 48 aand collector 50 of transistor 40 are regulated to a constant level even though their driving or load resistance may have low values. Also, the geometries of collectors 48 and 50 can be scaled to provide a predetermined ratio between the magnitude of the current supplied by collector 48 and the magnitude of the current supplied by collector 50. In the present embodiment, these currents may each equal 50 microamps. The current flowing out of collector 48 is designated as $I_1$, and the current flowing out of collector 50 is designated as $I_2$.

The third current source includes transistor 54, which has an emitter electrode connected to positive supply terminal 46, and diode 56, which is connected across the emitter-to-base junction of transistor 54. The bias current supplied by the power supply through the series circuit comprised of diode 56, diode 58 and resistor 60 provides a relatively constant voltage across diode 56 which holds the base-to-emitter voltage of PNP transistor 54 at a constant level. As a result, the constant collector current of transistor 54, which is designated as $I_3$, also is regulated to a constant amplitude even though the load impedance has a low value. Current $I_3$ may have a magnitude of 1 milliamp. PNP clamp transistor 62 has an emitter electrode connected to the collector electrode of transistor 54, a base electrode connected to the junction between diode 58 and resistor 60, and a collector electrode connected to the reference terminal.

The circuit of FIG. 1 may be said to have four regions of operation. The first region is a stable state wherein the output signal is at a relatively low level, $V_1$, as indicated by portion 64 of output waveform 66, shown in FIG. 3B. The second region is the dynamic state indicated by portion 67 of waveform 66 wherein the output signal level changes from relatively low level $V_1$ to relatively high level $V_2$. The third region of operation is the stable state indicated by portion 68 showing the output level at a magnitude of $V_2$. During the fourth operating region, which is a dynamic state, the output signal magnitude changes from high level $V_2$ back to relatively low level $V_1$ as indicated by portion 70 of waveform 66.

Figure 3:
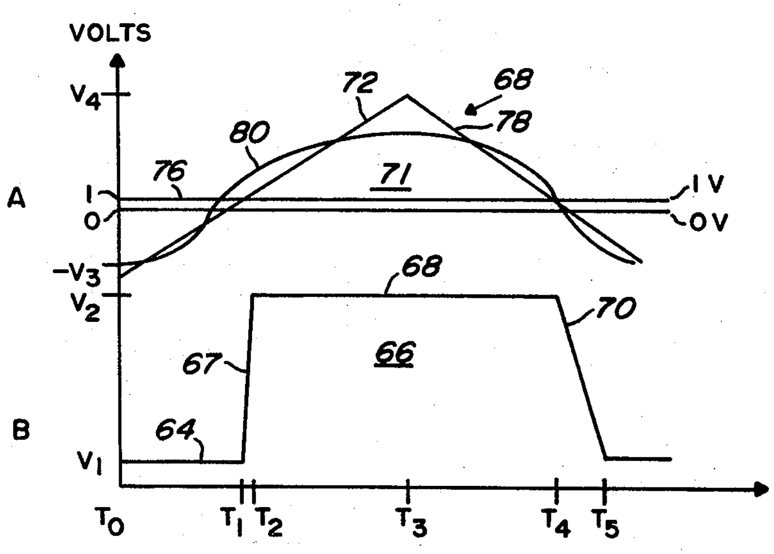
FIG. 3 is a timing diagram showing an output signal waveform which is produced in response to either of two differently shaped input signal waveforms.

Assume that an input signal 71 of FIG. 3A is applied between input terminals 11 and 13 of the circuit of FIG. 1. Input signal 71 includes a first rising ramp portion 72 which begins at negative voltage $V_3$ of FIG. 3A and rises to a peak positive voltage level, $V_4$. Between times $T_0$ and $T_1$ ramp signal 71 is not sufficiently positive to turn transistor 10 off. As a result, transistor 10 conducts all of current $I_1$ to ground as indicated in FIG. 1 to form a current sink. Since the voltage at the emitter of transistor 10 is near the ground potential, transistor 12 remains off and nonconductive. Hence, virtually no current flows through resistors 16 and 18 and thus no base-to-emitter voltage is applied to transistor 14 which is nonconductive.

Current $I_2$ from collector 50 of transistor 40 is applied to the base of transistor 22 which is rendered conductive and sinks part of current $I_2$. The emitter current of transistor 22 flows through the voltage divider comprised of resistors 26 and 28 and develops a voltage of sufficient magnitude across resistor 28 to render transistor 24 conductive so that it sinks the remainder of current $I_2$ to ground thru diodes 30 and 32, which form a clamp to keep transistor 24 from saturating. Transistor 24 also sinks current $I_3$ to ground. Because of the low resistance of conductive transistor 24, the output voltage at terminal 36 and across output capacitance 74 between times $T_0$ and $T_1$ is the relatively low level $V_1$, as indicated in FIG. 3B. Output capacitance 74 includes the capacitance of output transistor 24, the capacitance associated with conductor 75, terminal 36, and the load connected to terminal 36.

At time $T_1$, input voltage ramp 71 rises through threshold level 76, which may be one volt, to make the base of transistor 10 sufficiently positive to turn transistor 10 off. As indicated in FIG. 2, current $I_1$ is then diverted into the base of transistor 12 thereby rendering it conductive so that it now sinks current $I_1$ to provide increased emitter current through resistors 16 and 18. The emitter current from transistor 12 provides a base-to-emitter voltage across resistor 18 which renders transistor 14 conductive. However, a portion of $I_1$ is also conducted by diode 20 through the collector of transistor 14. Although transistor 14 is rendered conductive, it is not able to saturate because diode 20 clamps the base-to-collector voltage of transistor 14 above the saturation level. Thus, the collector of transistor 14 will be held at about one and one-half diode drops above the reference potential.

Transistor 14 sinks current $I_2$ to ground thereby removing the base current from transistor 22 to render it nonconductive. Thus, the base-to-emitter voltage of transistor 24, formerly developed across resistor 28, drops to render transistor 24 nonconductive. As a result, current $I_3$ linearly charges output capacitance 74 to cause the output voltage to rise from level $V_1$ to level $V_2$ between times $T_1$ and $T_2$, as indicated in FIG. 3B. The slope of output waveform portion 67 is equal to the magnitude of current $I_3$ divided by the value of capacitance 74. Therefore, the rise time can be increased by either increasing the magnitude of the current supplied by transistor 54 or decreasing the value of capacitance 74. The slope can be decreased either by decreasing the magnitude of the current supplied by transistor 54 or by increasing the value of capacitance 74.

Transistor 62 turns on at time $T_2$ to clamp the magnitude of the output voltage of the threshold detector circuit at constant level $V_2$. After transistor 62 is rendered conductive, current $I_3$ is steered through transistor 62 to ground. At time $T_2$, the output voltage at terminal 36 is at level $V_2$ which may be on the order of a diode drop less than the positive power supply terminal, V+.

At time $T_3$, ramp 72 reaches peak $V_4$ and then reverses slope to form ramp 78 which extends toward threshold level 76. At time $T_4$, the magnitude of ramp 78 crosses threshold level 76 which signifies that the input voltage has again sufficiently low magnitude to render transistor 10 conductive, transistors 12 and 14 nonconductive, and transistors 22 and 24 conductive. As a result, at time $T_4$, the output voltage at output terminal 36 begins to decrease from level $V_2$ toward level $V_1$, as shown in FIG. 3B. The slope of portion 70 illustrating this change in magnitude of the output voltage, is equal to the magnitude of current $I_2$ divided by the series combination of the capacitance of diodes 30 and 32. This is because capacitor 74 can discharge through transistor 24 only as fast as the junction capacitance of diodes 30 and 32 is discharged by current $I_2$. Thus, the rate of change of the output voltage from $V_2$ to $V_1$ may be decreased either by decreasing the magnitude of current $I_2$ or by increasing the composite junction capacitance of diodes 30 and 32. Alternatively, the rate of change of the output voltage from $V_2$ to $V_1$ may be increased either by increasing the magnitude of current $I_2$ or decreasing the composite junction capacitance of diodes 30 and 32. Hence, the techniques employed in the threshold circuit controls the rise and fall times of the output voltage and does not increase the circuit propagation delay and is accomplished without attaching a large capacitor to output terminal 36.

More specifically, to cause the magnitude of the output voltage to decrease, transistor 24 discharges both the parasitic capacitance 74 and the capacitances of diodes 30 and 32. Thus, by making the value of current $I_2$ small, for instance on the order of 50 microamps, and increasing the size of diodes 30 and 32, no matter how fast transistor 24 is turned on, current source $I_2$ and the diode capacitances control the fall time which is the period between times $T_4$ and $T_5$, and, hence, the slope of waveform 70 of FIG. 3B. The fall time of the output voltage at terminal 36 can be adjusted so that an unwanted amount of noise is not provided to a load connected to output terminal 36. This characteristic of threshold detector circuit of one embodiment of the invention makes it adaptable for use in dual ramp, analog-to-digital converter applications. The magnitude of the output voltage decreases at a constant rate from magnitude $V_2$ down to magnitude of voltage $V_1$, as shown in FIG. 3B.

Although the operation of the circuit has been described with respect to triangular wave input voltage 71, a triggering waveform of any shape could be applied which passes through threshold voltage 76 in a first direction away from an arbitrary reference voltage and passes through threshold voltage 76 in the opposite direction toward the arbitrary threshold voltage. Hence, input voltage waveform 80, which may be a portion of a sinusoidal input signal applied between input terminals 11 and 13, results in an output signal identical to that formed by triangular wave 71 because the amplitude of waveform 80 crosses threshold 76 at time $T_1$ in a first direction away from 0 axis 81, and waveform 80 crosses threshold axis 76 at time $T_4$ in a direction toward 0 axis 81.

As previously mentioned, output transistor 24 conducts between times $T_0$ and $T_1$, and transistor 14 conducts between times $T_2$ and $T_4$. Diodes 30 and 32 clamp the collector-to-base voltage of transistor 24 to keep it out of saturation, and diode 20 clamps the collector-to-base voltage of transistor 14 to keep it out of saturation. Without diodes 20, 30, and 32, there would be excess base charge flowing in transistors 14 and 24 when conductive which would result in an undesirably large amount of current stored therein. The base-to-emitter capacitance of transistors 14 and 24 would also charge up. These charges would then either to be conducted out of transistors 14 and 24 or recombined with carriers of the opposite conductivity type within transistors 14 and 24. The current conducted out of transistors 14 and 24 would have to be discharged through resistors 18 and 28 in order to render transistors 14 and 24 nonconductive. This discharge and recombination could undesirably slow the speed of circuit operation. Hence, transistors 14 and 24 are prevented from saturating to maintain speed by utilizing diodes 20, 30, and 32. Hence, neither Schottky diodes nor gold doping are required, each of which would require additional process steps which would further complicate the manufacture of integrated circuits which include the threshold detector.

From the above description, it is apparent that currents $I_1$, $I_2$, $I_3$, and either $I_4$, which is the collector current of transistor 12, or $I_5$, which is the collector current of transistor 22, are constantly supplied by the power supply. Since currents $I_4$ and current $I_5$ have approximately the same magnitudes, the threshold detector circuit continuously sinks virtually the same amount of current from the supply regardless of the output signal level. Power supply design is simplified by the threshold detector configuration because of the predictability of the constant current drawn and because the threshold detector circuit does not create current spikes by changing the magnitude of the current drawn from the supply with output level change.

Since the magnitude of the conducted current remains constant, the power dissipated by the portion of a chip including the threshold detector circuit remains constant to facilitate substantially no hysteresis between the input and output threshold levels. More specifically, when the threshold level detector changes state, the currents from the three current sources are merely steered into alternate paths. The only changes in power supply current occur in the collector currents for transistors 12 and 22. The values of resistors 18 and 28 are chosen so that the changes in these collector currents are relatively small. Moreover, the changes in the collector currents of transistors 12 and 22 tend to cancel each other out since transistors 12 and 22 are alternatively rendered conductive. Therefore, the circuit power dissipation remains constant, and the chip temperature changes are evenly distributed to contribute negligible hysteresis to the comparator threshold voltages which are temperature dependent.

Furthermore, the detector circuit can withstand an input voltage having a magnitude anywhere within the limits between a negative magnitude equal to the reference level all the way up to the power supply voltage, V+ plus the emitter-to-base breakdown voltage of transistor 10. Since transistor 10 has a grounded collector, it may be a vertical PNP substrate transistor which has high emitter-to-base voltage breakdown, high current gain, and a high frequency response as compared to a lateral PNP transistor. As a result, the base of the transistor 10 can be taken above the positive supply level V+, which could be as high as 18 volts, without breaking down the device.

One embodiment of the threshold detector, which has been found suitable for commercial fabrication in monolithic forms, includes passive components having the following values:

| | |
|---|---|
| resistor 16 | 1.2 kilo-ohms |
| resistor 18 | 2.8 kilo-ohms |
| resistor 26 | 0.7 kilo-ohm |
| resistor 28 | 2.8 kilo-ohms |
| resistor 44 | 14.3 kilo-ohms |
| resistor 60 | 13.6 kilo-ohms |

In this embodiment, the first stage, including transistors 10, 12, and 14, has a voltage gain of 1,000. The second stage, including transistors 22 and 24, has a voltage gain of 2,000 when driving MOS (metal-oxide-semiconductor) logic and a gain of 40 when driving standard TTL (transistor-to-transistor logic) gates. The rise and fall rate of the output voltage is about 5 volts in 200 nanoseconds. The input hysteresis is less than a tenth of a millivolt.

What has been described, therefore, is a threshold detector circuit with a controlled output slew rate and virtually no input hysteresis. The threshold detector circuit draws a constant amount of current and thereby maintains a constant power dissipation regardless of output state to provide virtually no input hysteresis and a predictable power supply drain. The rise and fall times of the output signal are controlled by the magnitudes of the currents supplied by internal current sources and the values of internal diode and output capacitances. The circuit configuration maintains selected transistors in a nonsaturated condition without utilizing gold doping or Schottky diodes and is suitable for manufacture by standard, bipolar processes for mass production. Because of the nonsaturating operating conditions and limited voltage swings within the circuit, propagation speed is high.

Although the subject circuit has been described for use as a threshold detector, logic functions may also be easily implemented by modifying the circuit. For example, an AND gate may be created by connecting the emitter of another PNP transistor to the emitter of transistor 10. The collector to ground and the base to form the second input. The basic configuration of the circuit of the preferred embodiment is suitable for use as a threshold detector, line driver receiver, comparator, logic gate and buffer.

I claim:

1. A magnitude responsive circuit providing an output signal at an output terminal thereof having one magnitude in response to the magnitude of an input signal applied to an input terminal thereof passing through a threshold level in a first direction and the output signal having another magnitude in response to the magnitude of the input signal passing through the threshold level in a second direction, the magnitude responsive circuit sinking a substantially constant amount of current regardless of the magnitude of the input signal and including in combination:

first active current supply means for providing a constant current at an output terminal thereof;

first active current sinking means for providing current amplification of at least greater than unity and having a control electrode connected to the input terminal of the magnitude responsive circuit, a first electrode connected to the output terminal of the first active current supply means, and a second electrode, said first active current sinking means being responsive to the magnitude of the input signal passing through the threshold level in one of the first and second directions to be rendered conductive to sink said constant current from said first active current supply means, said first active current sinking means being responsive to the magnitude of the input signal passing through the threshold level in the other of the first and second directions to be rendered nonconductive;

second active current sinking means for providing current amplification of at least greater than unity and having a control electrode connected to said output terminal of said first active current supply means and a first electrode, said second active current sinking means being rendered nonconductive in response to said first active current sinking means being conductive, said second active current sinking means being rendered conductive in response to said first active current sinking means being rendered nonconductive to sink said constant current from said first active current supply means; and first circuit means for providing coupling of said first electrode of said second active current sinking means to the output terminal of the magnitude responsive circuit, said first circuit means being responsive to said second active current sinking means being rendered nonconductive to provide the output signal of one magnitude and to said second active current sinking means being rendered conductive to provide the output signal of the other magnitude.

2. The magnitude responsive circuit of claim 1 wherein:

said first active current sinking means includes a first transistor means having said first and control electrodes, and a second electrode; and power supply means having a reference terminal connected to said second electrode of said first transistor means.

3. The magnitude responsive circuit of claim 1 wherein said second active current sinking means includes:

first transistor means having said control electrode and said first electrode, and a second electrode;

voltage divider means for providing a divided voltage and having a first terminal connected to said first electrode of said first transistor means, a second terminal and a third terminal; and power supply means for providing reference and magnitude voltages and having a voltage supply terminal connected to said second electrode of said first transistor means and a reference terminal connected to said third terminal of said voltage divider means, said first transistor means being rendered conductive in response to said first active current sinking means being rendered nonconductive to conduct said current from said first active current supply means between said control and first electrodes thereof and through said voltage divider means to said reference terminal to provide a divided voltage at said second terminal of said voltage divider means.

4. The magnitude responsive circuit of claim 3 wherein said first circuit means includes:

second active current supply means for providing constant current at an output terminal thereof; and second transistor means with control, first and second electrodes, said control electrode of said second transistor means being connected to said second terminal of said voltage divider means, said first electrode being connected to said output terminal of said second active current supply means and said second electrode being connected to said reference terminal, said second transistor means being rendered conductive by said divided voltage to conduct said current from said second active current supply means in response to said first transistor means being rendered conductive.

5. The magnitude responsive circuit of claim 4 wherein:

said second transistor means includes a bipolar transistor having base, collector and emitter electrodes corresponding to said control, first and second electrodes of said second transistor means; and further including diode means coupled between said collector and base electrodes of said bipolar transistor to keep said bipolar transistor from saturating.

6. The magnitude responsive circuit of claim 1 wherein said first circuit means includes:

second active current supply means for providing a constant current at an output terminal thereof;

third active current sinking means having a first electrode connected to said output terminal of said second active current supply means, and a control electrode coupled to said first electrode of said second active current sinking means, said third active current sinking means being rendered conductive to sink the current from said second active current supply means and nonconductive in response to said second active current sinking means being rendered conductive and nonconductive respectively; and fourth active current sinking means having a control electrode connected to said output terminal of said second active current supply means, said fourth active current sinking means being rendered conductive and nonconductive respectively in response to said third active current sinking means being rendered nonconductive and conductive so that one of said third and said fourth active current sinking means sinks said constant current from said second active current supply at all times during the operation of the magnitude responsive circuit.

7. The magnitude responsive circuit of claim 6 having voltage supply and reference terminals adapted to be connected to a power supply;

said fourth active current sinking means having a first electrode connected to said voltage supply terminal, a control electrode connected to said first electrode of said third active current sinking means and a second electrode;

voltage divider means having a first terminal connected to said second electrode of said fourth active current sinking means, a second terminal, and a third terminal connected to said reference terminal, said fourth active current sinking means when conductive sinking said constant current from said second active current supply means to said voltage divider to provide a divided voltage at said second terminal of said voltage divider means.

8. The magnitude responsive circuit of claim 1 wherein said first circuit means includes:

second active current supply means for providing a constant current at an output terminal thereof;

third active current sinking means having a first electrode connected to said output terminal of said second active current supply means, and a control electrode coupled to said first electrode of said second active current sinking means; and capacitive means connected to said first electrode of said third active current sinking means, said third active current sinking means being rendered conductive and nonconductive in response to said second active current sinking means being rendered nonconductive and conductive to thereby enable said constant current from said second active current supply means to charge and discharge said capacitive means to provide the output signal.

9. The magnitude responsive circuit of claim 8 wherein:

said third active current sinking means includes a transistor means having said first and control electrodes, and further having a second electrode; and reference terminal means adapted to be connected to a power supply, said second electrode being connected to said reference terminal means.

10. A magnitude responsive circuit having a selected output slew rate, including in combination:

first switchable circuit means having a threshold level, an input terminal adapted for receiving an input signal and an output terminal, said first switchable circuit means providing control signals at said output terminal thereof in response to the magnitude of said input signal passing through a threshold level;

first current supply means providing a current of a selected magnitude at an output terminal thereof;

bipolar transistor means having a collector electrode connected to said output terminal of said first current supply means, and a base electrode coupled to said output terminal of said first switchable circuit means and an emitter electrode;

reference terminal means adapted to be connected to a power supply, said reference terminal means being connected to said emitter electrode;

capacitive means having a selected value connected to said first electrode of said current sinking means, said current sinking means being rendered conductive and nonconductive in response to said control signals to thereby enable said current from said first current supply means to discharge and charge, respectively, said capacitive means to provide an output signal having a rise time which is controlled by said selected value of said capacitive means and said selected magnitude of said current of said first current supply means; and diode means coupled between said base and collector electrodes of said bipolar transistor means to insure that said bipolar transistor means does not go into saturation, said diode means thereby increasing the speed of operation of said current sinking means.

11. The magnitude responsive circuit of claim 10 wherein:

said diode means includes capacitance inherent therein having a selected value, said diode means having one terminal connected to said collector electrode of said bipolar transistor means and a second terminal; and second current supply means providing a constant current of a selected magnitude and having an output terminal connected to said second terminal of said diode means, said selected value of said capacitance of said diode means and said selected magnitude of said current supplied by said second current supply means determing the discharge rate of said output capacitive means to thereby control the rate at which said output voltage changes from a high level to a low level.

12. A threshold detector circuit responsive to an input voltage having a magnitude below a first threshold level to provide an output voltage of a first level and to the input voltage having a magnitude above a second threshold level to provide an output voltage of a second level, the threshold detector circuit being included in a portion of a monolithic chip and adapted to draw a constant current from a power supply having first and second power supply terminals to maintain the chip portion at an even temperature to cause the first and second threshold levels to be virtually equal to each other regardless of the output signal magnitude, the threshold detector circuit including in combination:

first constant current supply means having an input terminal connected to the first power supply terminal and an output terminal;

first switchable electron control means having a first electrode connected to said output terminal of said first current supply means, a control terminal adapted to receive the input signal, and a second electrode connected to the second power supply terminal, said first switchable electron control means conducting said constant current from said first constant current supply means in response to said input voltage magnitude being below said first threshold level; and second switchable electron control means having a first electrode connected to said first power supply terminal, a control electrode coupled to said first switchable electron control means and to said first constant current supply means, and a second electrode connected to said second power supply terminal, said second switchable electron control means conducting said current from said first constant current supply in response to said input voltage being above said second threshold level to thereby maintain the chip portion at an even temperature.

13. The threshold detector circuit of claim 12 wherein:

said first switchable electron control means is a first bipolar transistor having emitter, base and collector electrodes comprising said first, control and second electrodes of said first switchable electron control means;

said second switchable electron control means is a second bipolar transistor having collector, base and emitter electrodes comprising said first, control and second electrode of said second switchable electron control means, said base electrode of said second bipolar transistor being connected to said emitter electrode of said first bipolar transistor; and voltage divider means having a first terminal connected to said emitter electrode of said second bipolar transistor, a second terminal, and a third terminal connected to said second power supply terminal, said voltage divider means providing a control voltage at said second terminal in response to said second bipolar transistor being rendered conductive.

14. The threshold detector circuit of claim 13 further including:

second constant current supply means having an input terminal connected to said first power supply terminal and an output terminal;

third switchable electron control means having a first electrode connected to said output terminal of said second constant current supply means, a second electrode connected to said second power supply terminal and a control electrode coupled to said second switchable electron control means; and fourth switchable electron control means having a control electrode coupled to said third switchable electron control means and to said output terminal of said second constant current supply means, and a first electrode connected to said first power supply terminal and a second electrode coupled to said second power supply terminal, said fourth switchable electron control means conducting said current from said second constant current supply means in response to said third electron control means being nonconductive to thereby maintain the chip portion at a constant temperature.

15. The threshold detector circuit of claim 14 wherein:

said third switchable electron control means is a third bipolar transistor having collector, emitter and base electrodes corresponding to said first, second and control electrodes of said third switchable electron control means; and said fourth switchable electron control means includes a fourth bipolar transistor having base, collector, and emitter electrodes corresponding to said control, first and second electrodes of said fourth switchable electron control means.

16. The threshold detector circuit of claim 15 further including diode means connected from said base of said second transistor to said collector of said third transistor to keep said third transistor from saturating to thereby increase the speed of operation of the threshold detector circuit.

17. The threshold detector circuit of claim 14 further including:

third constant current supply means having an input terminal connected to the first power supply terminal and an output terminal, said third constant current supply means providing a constant current of a selected magnitude;

fifth switchable electron control means having a first electrode connected to said output terminal of said third constant current supply means, a second electrode connected to the second power supply terminal and a control electrode coupled to said fourth switchable electron control means, said fifth switchable electron control means being rendered conductive and nonconductive in response to the magnitude of said input signal being below and above said threshold level to selectively conduct said current from said third constant current supply means; and output capacitive means of a selected value connected to said first electrode of said fifth switchable electron control means, said output capacitive means being charged by the current from said third constant current source in response to said fifth switchable electron control means being rendered nonconductive to thereby provide said output signal of said second level and to maintain the chip portion at an even temperature, the selected magnitudes of said current of said third constant current source and said output capacitive means controlling the rate of change of said output level from said first level to said second level, said second level being higher than said first level.

18. The threshold detector circuit of claim 17 wherein said fifth switchable electron control means is a third bipolar transistor having collector, emitter and base electrodes corresponding to said first, second and control electrodes of said fifth switchable electron control means;

diode means coupled between said base and collector electrodes of said third transistor means to keep said third transistor means from going into saturation when rendered conductive to increase the switching speed of said third transistor.

19. The threshold detector circuit of claim 18 wherein said diode means has a capacitance associated therewith, said diode means connecting said output terminal of said second constant current source to said collector terminal of said third transistor, the values of said diode capacitance and the magnitude of the current of said second constant current source being selected to control the rate of discharge of said output capacitive means to control the rate of change of said output level from said second level to said first level.

20. A threshold detector circuit responsive to an input voltage having a magnitude below a first threshold level to provide an output voltage of one level and to the input voltage having a magnitude above the threshold level to provide an output voltage of another level, the threshold detector circuit including in combination:

first active current supply means providing a first constant current at an output terminal thereof;

first switchable means having a first electrode connected to said output terminal of said first active current supply means and a control electrode adapted to receive the input signal, said first switchable means conducting said first current and supplying a first control signal at an output terminal in response to said input voltage magnitude being one of below and above said threshold level, said first switchable means being rendered nonconductive and providing a second control signal at said output terminal in response to said input voltage magitude being the other of below and above said threshold level;

second active current supply means providing a second constant current at an output terminal thereof;

capacitive means connected to said output terminal of said second active current supply means and to an output terminal of the threshold detector circuit; and second switchable means having a control electrode coupled to said first switchable means, and another electrode connected both to said output terminal of said second active current supply means and to said capacitive mean, said second switchable means being responsive to one of said first and said second control signals to conduct said second constant current so that said capacitive means does not charge up so that the output signal remains at a low level, said second switchable means being responsible to the other of said first and said second control signals to be rendered nonconductive so that said second constant current charges said capacitive means to provide an output signal of a higher level than said low level.

21. A magnitude responsive circuit providing an output signal at an output terminal thereof having one magnitude in response to the magnitude of an input signal applied to an input terminal thereof passing through a threshold level in a first direction and an output signal at said output terminal thereof having another magnitude in response to said input signal applied to said input terminal passing through said threshold level in a second direction, the magnitude responsive circuit sinking a substantially constant amount of current regardless of the magnitude or direction of the input signal and including in combination:

first current supply means adapted to supply a constant current at an output terminal thereof;

first current sinking means havng a control electrode connected to the input terminal of the magnitude responsive circuit, a first electrode connected to the output terminal of said first current supply means and a second electrode, said first current sinking means being responsive to the magnitude of the input signal passing through said threshold level in one of the first and second directions to be rendered conductive to sink said current from said first current supply means, said first current sinking means being responsive to the magnitude of the input signal passing through the threshold level in the other of the first and second directions to be rendered nonconductive;

second current sinking means having a control electrode connected to said output terminal of said first current supply means and a first electrode, said second current sinking means being rendered nonconductive in response to said first current sinking means being conductive, said second current sinking means being rendered conductive in response to said first current sinking means being rendered nonconductive to sink said constant current from said first current supply means;

second current supply means adapted to supply a constant current at an output terminal thereof;

third current sinking means having a control electrode coupled to said first electrode of said second current sinking means, a first electrode and a second electrode connected to said output terminal of said second current supply means, said third current sinking means being rendered conductive in response to said second current sinking means being conductive, said third current sinking means being rendered nonconductive in response to said second current sinking means being rendered nonconductive to sink said constant current from said second current supply means;

fourth current sinking means having a control electrode connected to said second electrode of said third current sinking means, a first electrode and a second electrode, said fourth current sinking means being rendered conductive in response to said third current sinking means being rendered nonconductive to sink said constant current of said second current supply means and said fourth current sinking means being rendered nonconductive in response to said third current sinking means being rendered conductive;

third current supply means adapted to supply a constant current at an output terminal thereof;

fifth current sinking means having a control electrode coupled to said first electrode of said fourth current sinking means, a first electrode and a second electrode connected to said output terminal of said third current supply means, said fifth current sinking means being rendered conductive in response to said fourth current sinking means being rendered conductive to sink said constant current from said third current supply means, said fifth current sinking means being rendered nonconductive in response to said fourth current sinking means being rendered nonconductive;

power supply means having a reference electrode coupled to said second electrode of said first current sinking means and to said first electrode of said second, third, fourth and fifth current sinking means and having an output terminal;

sixth current sinking means having a control electrode coupled to said output terminal of said power supply means, a second electrode connected to said second electrode of said fifth current sinking means and a first electrode connected to said reference terminal of said power supply means, said sixth current sinking means being rendered nonconductive in response to said fifth current sinking means being rendered conductive, said sixth current sinking means being rendered conductive in response to said fifth current sinking means being rendered nonconductive to sink said constant current from said third current supply means; and an output terminal of said magnitude responsive circuit connected to said second electrode of said fifth current sinking means.

* * * * *